March 31, 1970     D. R. JONES     3,503,409
READOUT DEVICE FOR VORTEX AMPLIFIERS
Filed Dec. 9, 1964     2 Sheets-Sheet 1

INVENTOR
D. ROLAND JONES
BY Harwitz + Rose
ATTORNEYS

March 31, 1970 D. R. JONES 3,503,409
READOUT DEVICE FOR VORTEX AMPLIFIERS
Filed Dec. 9, 1964 2 Sheets-Sheet 2

INVENTOR
D. ROLAND JONES

BY *Hurvitz & Rose*

ATTORNEYS

United States Patent Office 3,503,409
Patented Mar. 31, 1970

3,503,409
READOUT DEVICE FOR VORTEX AMPLIFIERS
Donnie R. Jones, Silver Spring, Md., assignor to Bowles Engineering Corporation, Silver Spring, Md., a corporation of Maryland
Filed Dec. 9, 1964, Ser. No. 417,850
Int. Cl. F15c 1/08
U.S. Cl. 137—81.5                    20 Claims The present invention relates to a readout device for vortex amplifiers and, more particularly, to a readout for a vortex amplifier for determining when an input signal to the amplifier has reached a predetermined value as determined by the rate of rotation of fluid existing from the vortex amplifier.

In the field of vortex amplifiers, it is often desirable to be able to produce an indication of when an input signal has achieved a predetermined value. Such an indication may be employed in a system for producing an alarm when an input signal has exceeded a predetermined safe value or may be employed to initiate a specific correction function when the system to be controlled has exceeded a predetermined and specified operating condition.

In any event, the ability to detect when a signal has achieved a predetermined value or exceed either limits of a predetermined range is a desirable feature of any amplifier system.

It is therefore an object of the present invention to provide a readout device for vortex amplifiers which device is capable of producing an indication of the fact that an input signal has exceeded a predetermined value either in a positive or negative sense.

It is another object of the present invention to provide a readout device for a vortex amplifier which is capable of determining when the rate of rotation of the fluid egressing from a vortex amplifier has reached a predetermined rate of rotation or has exceeded either of the limits of a predetermined range of rates of rotation, be these limits in the same sense of rotation or at extremes of opposite senses of rotation of the induced vortical flow in the amplifier.

The above and still further objects, features and advantages of the present invention will become apparent upon consideration of the following detailed description of one specific embodiment thereof, especially when taken in conjunction with the accompanying drawings, wherein.

Figure 1:
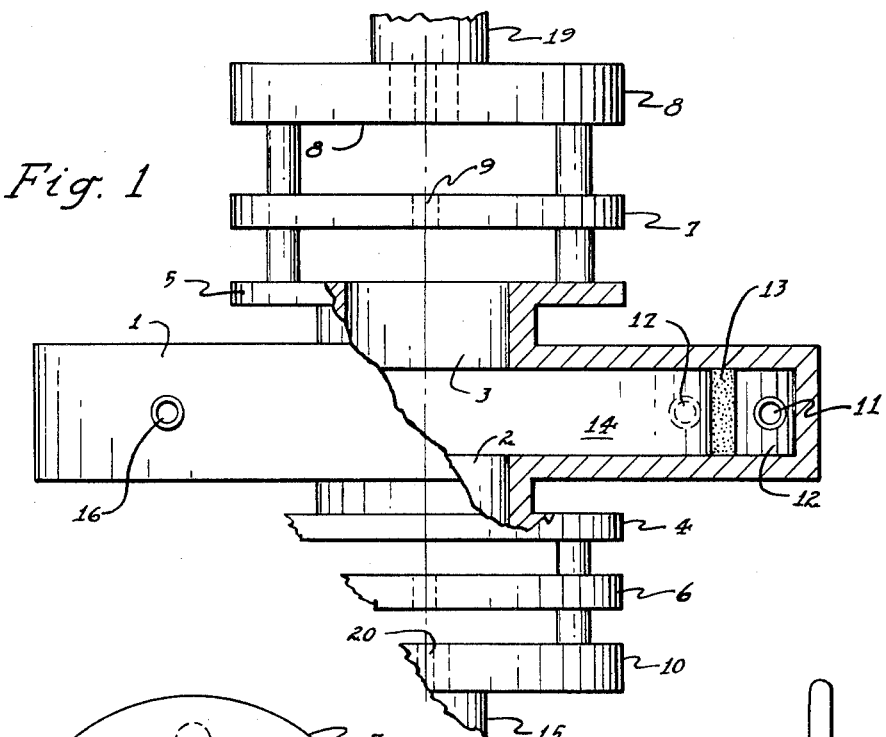
FIGURE 1 illustrates a vortex amplifier employing the readout device of the present invention.
Figures 2, 3A, 3B, 3C:
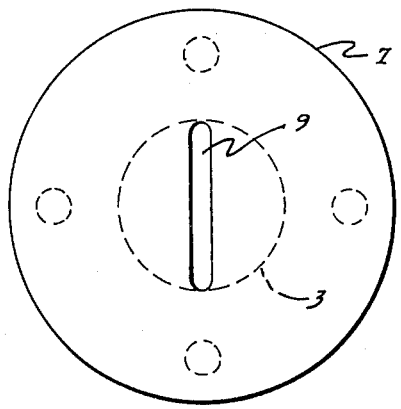
FIGURE 2 is a front view of the plate 4 of FIGURE 1.
FIGURES 3a, 3b and 3c illustrate shapes assumed by the fluid after passing through a slot in the plate of FIGURE 2 as determined by the rate and direction of rotation of the fluid egressing from the vortex amplifier.

Referring now specifically to FIGURES 1 and 2 of the accompanying drawings, there is illustrated a hollow cylindrical vortex amplifier 1 having egress pipes 2 and 3. The pipes 2 and 3 terminate in outwardly extending flanges 4 and 5, respectively, which are employed to support further plates 6 and 7.

Further plates 8 and 10 are spaced from, parallel to and supported on the plates 6 and 7, respectively, the plates 7 and 8 and 6 and 10 serving a purpose to be described now. Referring specifically to FIGURE 2, which is a top view of plate 7, the plate 7 is a solid flat disk having a generally rectangular slot 9 formed symmetrically with respect to the axis of the circular axis of the plate. The slot 9 has a length or major axis which is equal to the diameter of the pipe 3 and has a relatively narrow minor axis or width.

Fluid may be introduced into the vortex amplifier in any conventional manner such as through a pipe 11 which supplies fluid into a region 12 between an outer circumferential wall of the amplifier 1 and an annular inner wall 13 which is pervious to fluid. The region 12 between the outer wall and the annular wall 13 is filled with fluid from the pipe 11. The fluid flows through the wall 13 in a radial direction into a vortex chamber which is designated by the reference numeral 14. In the absence of input signals, the flow through the chamber 14 is radial and the flow through the pipes 2 and 3 is completely axial. In consequence, the fluid passing from the pipe 3 through the slot 9 in the plate 7 assumes the configuration illustrated in FIGURE 3a.

In order to introduce fluid signals into the vortex chamber 14, there may be provided a first pipe 16 and a second pipe generally designated by the reference numeral 17. The pipe 17 is illustrated by dashed lines since it cannot be seen in the figure illustrated in FIGURE 1. The pipe 17 lies in the same position to the right side of the vortex chamber 14 as the pipe 16 assumes relative to the left side of the chamber. If fluid is introduced through the pipe 16 tangentially, into the chamber 14, rotation of the fluid is produced in the chamber 14. If fluid is introduced through the pipe 17, rotation is also induced in the fluid in the chamber 14, but this rotation is in a sense opposite to that induced by the flow through the tube 16. Referring again specifically to FIGURE 2, if fluid is introduced through the input tube 16, then the fluid in the vortex chamber assumes a clockwise rotation and is vortically amplified in the chamber 14. The fluid exiting through the tube 3 has a clockwise rotation and, as a result thereof, the fluid exiting through the passage or slot 9 in the plate 7 has a clockwise component of rotation and assumes the general configuration as illustrated in FIGURE 3c. This configuration is generally S-shaped or sinuous. The degree of rotation of the rectangular stream of fluid over its reaches is a function of the rotational velocity of the fluid.

If fluid is introduced into the chamber 14 through the input pipe 17, the rotation as seen looking down at the top of the plate 7, as in FIGURE 2, is counterclockwise and the fluid exiting through the slot 9 assumes a reverse S shape as illustrated in FIGURE 3b. Again, the degree of rotation of the rectangular stream after exiting from the slot 9 is determined by the rotational velocity of the fluid. It can be seen, therefore, that the configuration of the fluid after exiting from the slot 9 is determined both by the direction and rate of rotation of the fluid exiting from the pipe 3.

Figure 4:
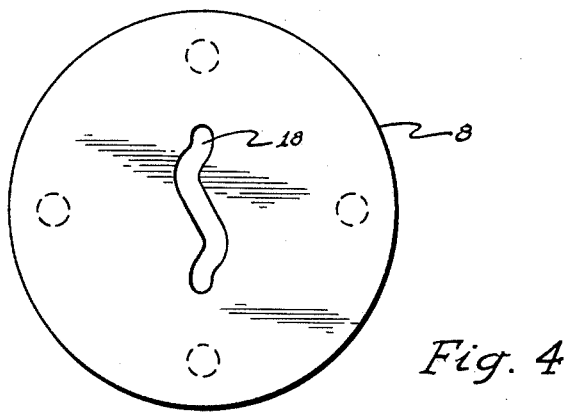
FIGURE 4 is a front view of the plate 8 of FIGURE 1.

Referring now specifically to FIGURE 4 of the accompanying drawings, there is illustrated a top view of the plate 8 of FIGURE 1. The plate 8 is provided with an S-shaped slot 18 symmetrical relative to the center of the plate. The slot 18 may be of the same general shape of one or the other of the shapes illustrated in FIGURES 3b and 3c and is illustrated for purposes of explanation as having a shape similar to that of FIGURE 3b. The amount of fluid passing through the slot 18 is determined by the pattern of the fluid developed after the fluid exits from the slot 9 in the plate 7. If the direction and rate of rotation of the fluid exiting through the pipe 3 is such that the pattern of the stream leaving the slot 9 conforms exactly to the pattern of the slot 18, a maximum of fluid flows through the slot 18 and into a pipe 19 positioned to receive fluid passing through the slot 18. At any other rate of rotation or when the sense of rotation is opposite to that determined by the slot 19, a lesser quantity of fluid is directed to the passage 18. By providing a maximum flow or maximum pressure detector in communication with the pipe 19, it is possible to determine when the fluid has achieved a predetermined sense and rate of rotation.

The readout apparatus associated with the pipe 2 may be the same as employed in conjunction with the pipe 3. A slot 20 formed in plate 10 may be such as to define a limit of rate of rotation in the same or opposite sense to that provided by the slot 18 in plate 8. More particularly, if a flatter S than that provided by the slot 18 in the plate 8 is provided in the plate 10 and the pattern is such as to sense the same direction of rotation as the pattern in the plate 8, then it is possible to determine when the rate of rotation in a given direction falls below or rises above a predetermined rate. Conversely, the slot 20 in the plate 10 may be employed to determine when the fluid in the chamber is rotating in an opposite direction at a predetermined rate, and thus it is possible to determine whether the fluid exceeds the same or different rates of rotation in opposite senses.

It should be noted that the plates 8 and 10 should be readily demountable from the apparatus so that they may be replaced with plates having other configurations of slots so that the apparatus may be readily adapted to produce maximum output signals when different rates or directions of rotation are to be sensed.

Figure 5:
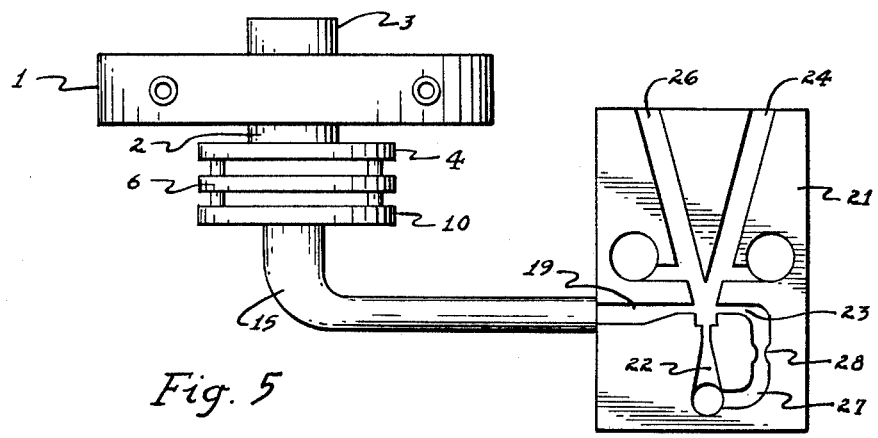
FIGURE 5 is a schematic diagram of a fluid circuit for sensing flow from said readout device of the present invention.

Referring now specifically to FIGURE 5 of the accompanying drawings, there is illustrated an apparatus for determining when the pattern of fluid existing through one of the plates, for instance, the plate 6, corresponds to the pattern of the opening in the plate 10, and thus produces maximum flow to the pipe 15, which communicates with the opening in the plate 10. The pipe 15 is connected to a left control nozzle 19 of a standard pure fluid flip-flop, generally designated by the reference numeral 21. The flip-flop is provided with a power nozzle 22, a right control nozzle 23 and two output passages 24 and 26. The right control nozzle 23 is connected to the power nozzle 22 via a passage 27 having a pressure-chopping fluid constriction 28 formed therein. As a result of this latter connection, a bias flow is established from the control nozzle 23 that initially maintains the fluid stream issued by the power nozzle 22, directed to the output passage 26. The boundary layer effects between the fluid stream and the left sidewall of the amplifier 21, plus the fluid bias signal issued by the control nozzle 23 is such that, in the absence of maximum flow of fluid to the passage 15 and thence to the control nozzle 19, the stream remains completely diverted to the output passage 26. However, upon maximum fluid flow to the pipe 15, the fluid stream is diverted completely to the output passage 24.

In an arrangement of the type illustrated in FIGURE 5 and described above, as soon as the signal applied to the pipe 15 falls below a maximum, whether this be due to the rate of rotation of the fluid in the chamber 14 decreasing or increasing beyond the rotational velocity detected by the slot in the plate 10, the stream is switched back to the output passage 26. In this type of device, one may apply the output to the passage 24 to a counter to determine the number of times in a given operation the signal exceeds a predetermined value. If it is desired to provide a safety system that produces a permanent indication of the fact that the signal has at least equaled the maximum rotational velocity as determined by the pattern of the slot in the plate 10, then the right control nozzle 23 may be eliminated and the divider between the two output passages 24 and 26 may be positioned slightly asymmetrical relative to the centerline of nozzle 22 so that upon initial issuance of fluid from the nozzle 22, it is diverted to the passage 26. If the fluid in the pipe 15 achieves a maximum value, the fluid stream is switched to the channel 24 and is maintained in this position by boundary layer effects. This system cannot reset itself and provides a permanent indication of the fact that the signal has achieved a specific limit. The system thereafter may be manually reset by temporarily terminating flow to the nozzle 22 or the right control nozzle 23 may be employed in conjunction with a manual valve for reset purposes.

It is obvious that the pipe 19, associated with the plate 8, may be connected to an arrangement substantially identical with that to which the pipe 15 is connected so that both passages may be employed in a given system. It is also apparent that one or the other of the pipes 2 or 3 may be connected directly to a conventional vortex amplifier output detector so that only one of the pipes is associated with the apparatus of the present invention. Such an output detector may provide a continuous indication of direction and rate of rotation of the signal in the amplifier 1, and may take the form of the detector described in my co-pending application Ser. No. 301,868, filed Aug. 13, 1963 for Readout for Vortex Amplifier, now U.S. Patent No. 3,272,213.

It should be noted that the spacing between the plates 5, 7 and 8 and 4, 6 and 10 is employed to provide exits for overflow fluid, this being necessary since the slots in the plate accept only portions of the fluid applied to each.

What is claimed is:

1. An apparatus for determining when the rate of rotation of a fluid input stream has achieved a predetermined value, comprising a first member having a rectangular slot formed therein for receiving said fluid input stream and for issuing said input stream as a further fluid stream from said rectangular slot, said further fluid stream having a flow configuration which varies from the shape of said rectangular slot as a function of the rate of rotation of said input fluid stream, a second member generally coaxial with and spaced downstream from said first member and having a slot formed therein, said slot in said second member having a generally S-shaped configuration, said slot in said second member passing therethrough varying quantities of said further fluid stream as a function of the flow configuration of said further fluid stream, and means adapted to direct said input fluid stream toward said first member.

2. The combination according to claim 1 further comprising means for determining when fluid flow through the slot in said second member is at a maximum.

3. An apparatus for determining when the rate of rotation of a fluid input stream has achieved a predetermined value, comprising a first member having a rectangular slot formed therein for receiving said fluid input stream and for issuing said input stream as a further fluid stream from said rectangular slot, said further fluid stream having a flow configuration which varies from the shape of said rectangular slot as a function of the rate of rotation of said input fluid stream, a second member generally coaxial with and spaced downstream from said first member and having a slot formed therein, said slot in said second member having a generally sinuous configuration, said slot in said second member passing therethrough varying quantities of said further fluid stream as a function of the flow configuration of said further fluid stream, and means adapted to direct said input fluid stream toward said first member.

4. A readout device for a vortex amplifier having at least one egress orifice for issuing a first stream of fluid having a variable rotational flow rate, said device comprising a first member for receiving said first stream of fluid located downstream of said egress orifice and coaxial therewith, a generally rectangular slot formed in said member for issuing a further stream of fluid having a flow configuration which varies as a function of the rotational flow rate of said first stream of fluid, a second member for receiving said further stream of fluid located downstream of said first member and coaxial therewith and a generally S-shaped slot formed in said second member for conducting varying portions of said further fluid stream as a function of the flow configuration of said further fluid stream.

5. The combination according to claim 4 further comprising means for detecting maximum flow through said S-shaped slot.

6. A readout device for vortex amplifiers having two opposed egress orifices for issuing respective first and second egress fluid streams having variable rotational flow rates, comprising first and second members for receiving said first and second egress fluid streams respectively, each member having a generally rectangular slot formed therein for issuing a further fluid stream having a flow configuration which varies from said rectangular slot configuration as a function of the rotational flow rate of its associated egress fluid stream, each of said members being generally coaxial with and located downstream from a different one of the egress orifices of the vortex amplifier, and third and fourth members located downstream of and generally coaxial with said first and second members respectively for receiving the respective further fluid streams issued by said first and second members, said third and fourth members each having a generally S-shaped slot formed therein for conducting varying portions of said respective further fluid streams as a function of the flow configurations thereof, said S-shaped slots having different degrees of curvature.

7. The combination according to claim 6 further comprising first and second means for determining when fluid flow thereto is at a predetermined rate, each of said first and second means receiving fluid flowing through a different S-shaped slot.

8. A readout device for vortex amplifiers having two opposed egress orifices for issuing respective first and second egress fluid streams having variable rotational flow rates, comprising first and second members for receiving said first and second egress fluid streams respectively, each member having a generally rectangular slot formed therein for issuing a further fluid stream having a flow configuration which varies from said rectangular slot configuration as a function of the rotational flow rate of its associated egress fluid stream, each of said members being generally coaxial with and located downstream from a different one of the egress orifices of the vortex amplifier, and third and fourth members located downstream of and generally coaxial with said first and second members respectively for receiving the respective further fluid streams issued by said first and second members, said third and fourth members each having a generally sinuous slot formed therein for conducting varying portions of said respective further fluid streams as a function of the flow configurations thereof, said sinuous slots having different degrees of curvature.

9. An apparatus for monitoring the rate of rotation of a fluid stream comprising a member having a fluid conducting orifice extending through said member, said orifice having an axis and being of a first predetermined geometrical configuration such that the length of a straight line drawn between points on the periphery of said orifice and passing through said axis vary in length with the angular position of the line in rotation about said axis, means for providing a fluid flow having a flow component along the axis of said orifice so that said orifice issues a stream of fluid having at least initially the geometrical configuration of said orifice, means for inducing a rotation in said fluid about said axis upstream of said orifice thereby causing distortion of said stream of fluid downstream of said orifice relative to said first predetermined configuration and means for receiving varying portions of said stream of fluid as a function of the degree of distortion of said stream of fluid issued by said orifice, said means for receiving having an inlet orifice of a second predetermined geometrical configuration different from said first predetermined geometrical configuration.

10. The combination according to claim 9 wherein said means for receiving includes means for providing an indication when said rotational rate component of said input fluid exceeds a specified level.

11. The combination according to claim 9 wherein said first predetermined configuration is a substantially rectangular slot and wherein said second predetermined configuration is a generally S-shaped slot.

12. The combination according to claim 9 further comprising a fluid passage, said member located at the downstream end of said passage with said fluid conducting orifice being coaxial with said passage and means for supporting said inlet orifice downstream of and axially aligned with said fluid conducting orifice.

13. The combination according to claim 12 wherein the regions between said passage and said fluid conducting orifice and between said orifices are vented to ambient pressure.

14. The combination according to claim 13 wherein said first predetermined configuration is a substantially rectangular slot and said second predetermined configuration is a substantially S-shaped slot.

15. The combination according to claim 14 wherein said passage is cylindrical in shape, wherein said rectangular slot has a length substantially equal to and a width substantially smaller than the diameter of said passage, said rectangular slot being disposed coaxial with said passage, and wherein said S-shaped slot is disposed with respect to said rectangular slot such that both ends and the middle of said S-shaped slot are aligned respectively with corresponding ends and the middle of said rectangular slot.

16. The combination according to claim 15 wherein said means for supplying comprises a vortex amplifier having an egress orifice connected to said passage.

17. The combination according to claim 16 wherein said vortex amplifier has a second egress orifice, said apparatus further comprising a second passage connected to said second egress orifice, a second member having a second substantially rectangular slot shaped orifice, means for supporting said second member downstream of said second passage, said second rectangular slot being aligned with said second passage, a third member having a substantially S-shaped orifice extending therethrough, means for supporting said third member downstream of said second member such that said S-shaped slot receives varying portions of fluid as a function of the rotational rate of fluid flowing in said second egress orifice.

18. The combination according to claim 17 further comprising means for indicating when the fluid flow through said second and fourth mentioned orifices exceed respective predetermined levels.

19. The combination according to claim 9 wherein said means for supplying comprises a fluid vortex amplifier having a fluid egress orifice connected to said passage.

20. The combination according to claim 19 wherein said vortex amplifier has a second egress orifice, said apparatus further comprising a second member means having a third orifice of said first predetermined configuration and responsive to axially flowing input fluid for issuing a second stream of fluid having a crosssectional configuration which is substantially the same as said first predetermined configuration, the rotational rate of flow of fluid in said second egress orifice causing distortion of said second stream from said predetermined configuration, and means for receiving varying portions of said second stream of fluid in response to the amount of distortion of said second stream of fluid from said predetermined geometrical configuration, said last mentioned means having an inlet orifice of a third predetermined configuration.

References Cited

UNITED STATES PATENTS

| | | | |
|---|---|---|---|
| 738,199 | 9/1903 | Jost | 138—45 |
| 1,986,600 | 1/1935 | Pigott | 138—45 |
| 2,567,998 | 9/1951 | Griffith | 138—42 |

SAMUEL FEINBERG, Primary Examiner

U.S. Cl. X.R.

138—44